March 18, 1958 C. B. COLEMAN 2,827,074
CONSTANT FLOW LIQUID DISPENSING APPARATUS
Filed June 24, 1955 2 Sheets-Sheet 2
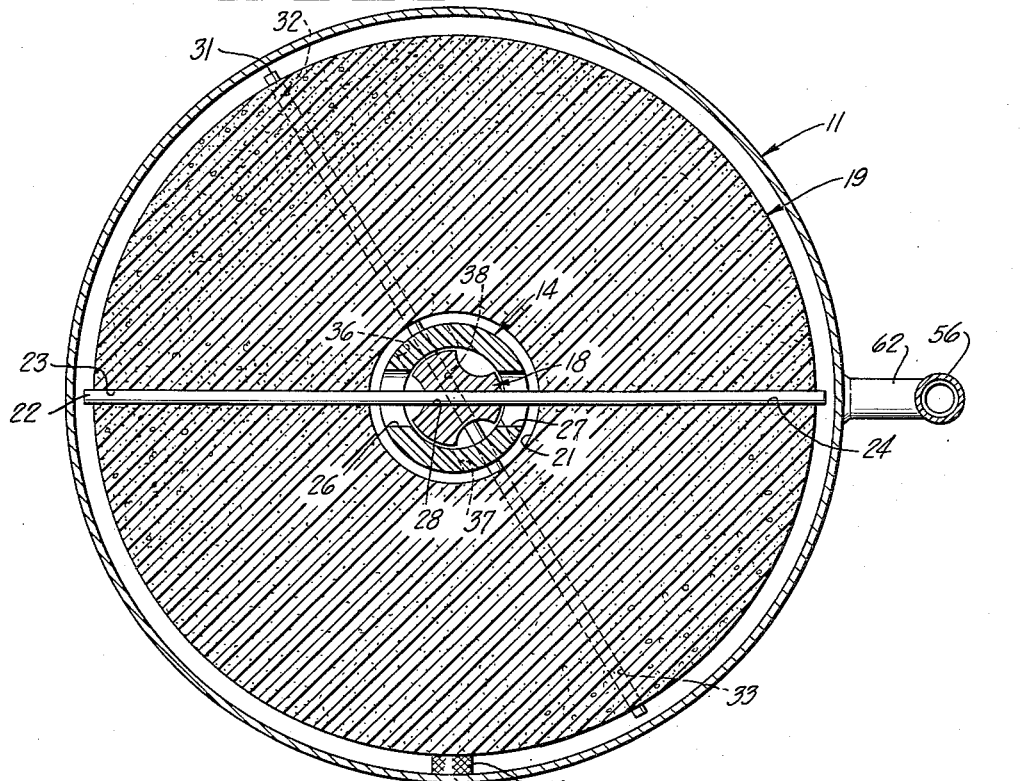
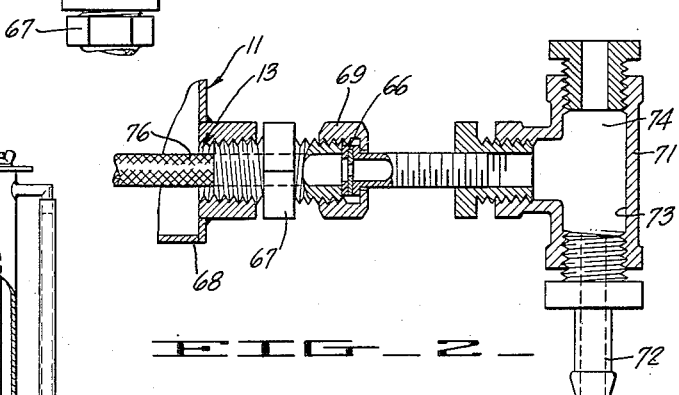
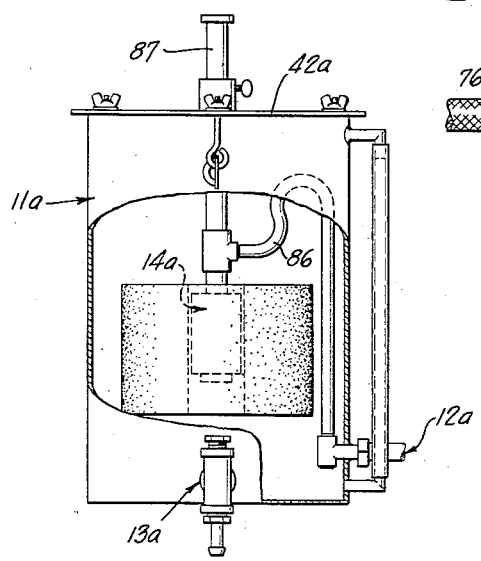
INVENTOR.
Clarence B. Coleman United States Patent Office 2,827,074
Patented Mar. 18, 1958

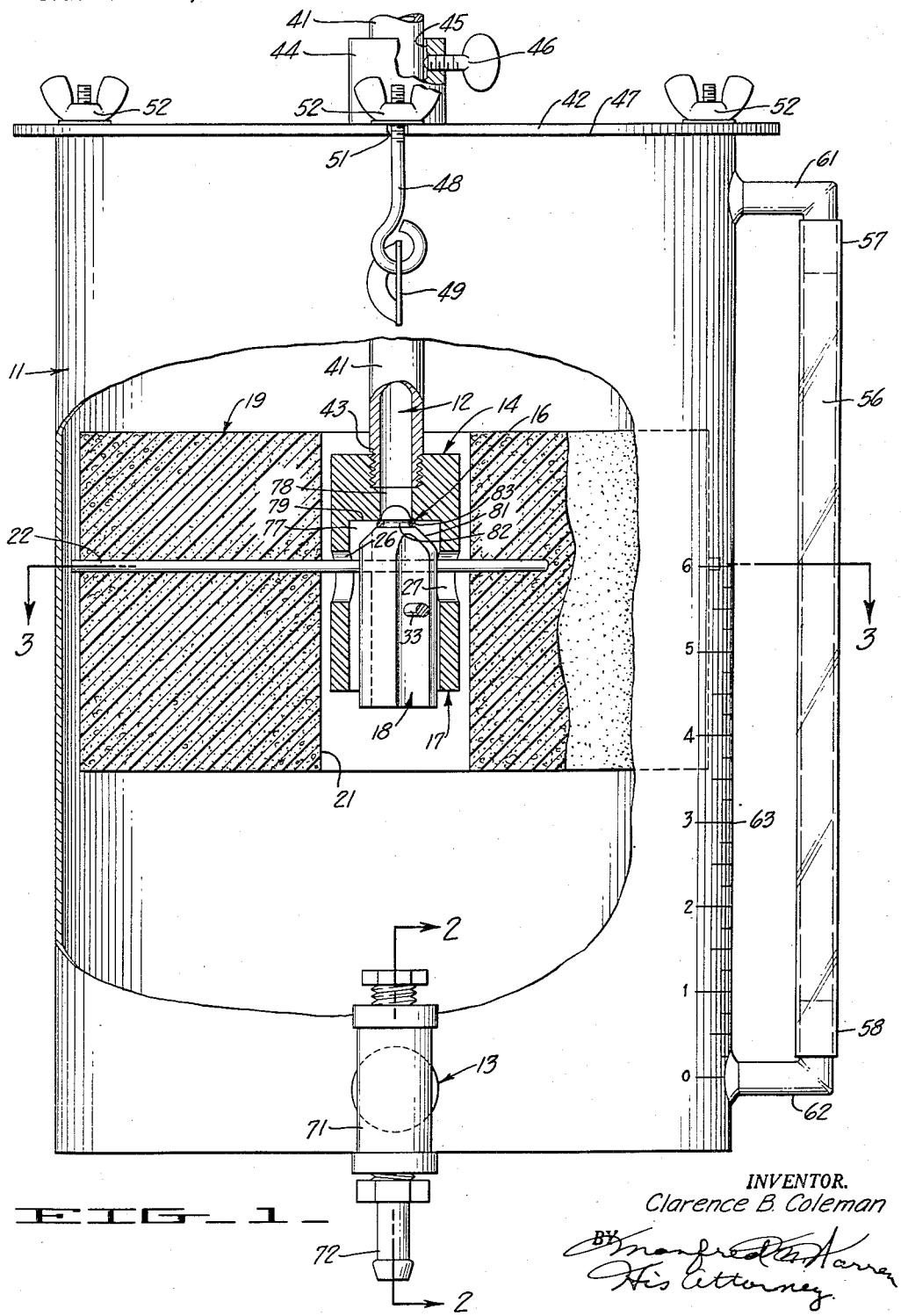

2,827,074

CONSTANT FLOW LIQUID DISPENSING APPARATUS

Clarence B. Coleman, Oakland, Calif.

Application June 24, 1955, Serial No. 517,795

11 Claims. (Cl. 137—426)

The invention relates to liquid dispensing devices adapted for supplying relatively concentrated liquids such as liquid fertilizers and the like to irrigation water for dilution and distribution to farm land.

As will be understood there has been a growing use in agriculture of concentrated liquid fertilizers such as aqua ammonia, phosphoric acid et cetera which may be added at a low rate of flow to irrigation water for cutting to a desired concentration and for distribution to the soil. These liquid materials are relatively expensive but may and must be greatly diluted for safe use and accordingly it is highly important for the over-all beneficial and safe economical use of the materials that they be uniformly applied at desired strength. Normally liquid fertilizers are supplied to the farmer in large tanks or drums. The material is taken from such large containers through control valves to an irrigation ditch where the concentrated liquid is fed into a relatively large quantity of irrigation water for dilution and distribution. Since the rate of flow of the liquid through the regulating valve is dependent upon the head of liquid in the containers and the extent of opening of the valve, the system has required continuous watching and frequent and periodic adjustment of the control valve so as to keep the liquid fertilizer flow within both safe and beneficial rates. It is accordingly an object of the present invention to provide a liquid dispensing apparatus of the character described which will be automatically controlled and will accurately dispense liquid from conventional supply containers and in accordance with conventional field practice at a uniform and constant rate so as to obtain at all times a desired fertilizer concentration in the irrigation water irrespective of the head of liquid in the supply tank.

Another object of the present invention is to provide an apparatus of the character described which may be quickly and easily adjusted in the field to obtain various constant rates of flow over a very wide range so that the letting in of the liquid fertilizer may be readily set proportional to the flow of irrigation water and in accordance with the recommendation of an agronomist on the job.

A further object of the present invention is to provide an apparatus of the character above which is composed of a minimum number of simply formed parts designed for inexpensive construction from materials which are substantially inert to the chemicals handled and which will give a long, useful and trouble-free life to the apparatus and provide for a simple and inexpensive maintenance thereof.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by said drawings and description may be adopted within the scope of the invention as set forth in the claims.

Referring to said drawings:

Figure 1 is a side elevation of a constant flow liquid dispensing apparatus constructed in accordance with the present invention with parts broken away and shown in cross section.

Figure 2 is a fragmentary cross sectional view taken substantially on the plane of line 2—2 of Figure 1.

Figure 3 is a plan sectional view of the apparatus taken substantially on the plane of line 3—3 of Figure 1.

Figure 4 is a view similar to Figure 1 but showing a modified form of the apparatus.

The constant flow liquid dispensing apparatus of the present invention consists briefly of a container 11 for liquid having inlet and outlet passages 12 and 13, means in the form of a valve housing 14 mounted in the container in communication with the inlet passage 12 and providing a downwardly opening valve seat 16 and depending guide means 17, a valve 18 mounted internally of the guide means for vertical reciprocation to and from the valve seat 16 so as to control the flow of liquid into the container from the inlet passage 12, and a float 19 mounted in the container and having a hollow core 21 dimensioned to surround the valve housing 14 and guide means 17 and being connected to the valve 18 for joint vertical movement whereby the liquid flow will be controlled as a function of the liquid head in the container and a constant head of liquid thus maintained over the outlet passage 13. Preferably, means is provided for limiting the relative downward movement of the float and the valve with respect to the valve seat so as to retain the valve, guide means and float in their unitary concentric internested assembly as illustrated in Figures 1 and 2.

The latter feature is accomplished by use of means connecting the float and valve which extends transversely through the guide means 17 and is supported thereby in a lowermost position of the valve and float. As here shown, a cross pin 22 is inserted through diametrically opposed openings 23 and 24 in the float, 26 and 27 in the guide means 17 and a diametrically extending opening 28 in the valve 18. In order to hold the several parts in fixed concentric relation so that there will be no wear or additional friction, a second cross pin 31, arranged angularly to cross pin 22 and at a lower elevation, is extended through diametrically opposed openings 32 and 33 in the float, 36 and 37 in the guide means 17 and a diametric opening 38 in the valve 18. As will be observed from Figure 1, the openings 26, 27 and 36 and 37 in the guide means 17 are over-size or at least vertically elongated so as to permit limited movement of the valve upwardly to its closed position on seat 16 and downwardly therefrom to an open position with the cross pins 22 and 31 resting on the bottoms of openings 26, 27 and 36 and 37. The diametric arrangement of the pins and their angularity reduce relative rocking movement between the parts to a minimum and at all times hold them in spaced concentric relation so that the float and valve will reciprocate vertically to perform their intended functions without rubbing on the valve housing.

As will be further observed the toroidal shape of the float and its positioning in surrounding relation to the valve housing enable the use of a large float uninhibited in size except for the size of the container itself. Accordingly, a sufficiently large float may be used so as to not only carry the valve 18 with extreme precision but also to enable the float to overcome almost any input pressure which may exist in the supply line. Modest pressures are apt to exist due to vaporization of the liquid in the large supply containers while standing in the sun and perhaps from other causes and the present unit may be readily designed for operation with input pressures from 0 to 20 p. s. i., the latter being well over the code allowances for non-pressure supply tanks normally used.

Another and very important feature of the present invention is the provision of a manually engageable and operable means for adjusting the position of the assembly within the container so as to determine the head of liquid therein. In the form of the invention illustrated in Figures 1 to 3 this adjustment is obtained by raising and lowering a liquid inlet pipe 41, providing the inlet passage 12 and here slidably mounted through a removable cover 42 for the container for vertical reciprocation of a lower end 43 of the pipe to which the valve housing 14 is secured. For this purpose the cover 42 is formed with a centrally arranged boss 44 and an axial bore 45 therethrough and slidably carrying the pipe 41. A set screw 46 carried by the boss may be used for tightening down on the pipe to lock the latter to the cover in a selected vertical position of the valve housing 14. The cover may be removably secured to the top rim 47 of the container by any suitable means. As here shown a plurality of circumferential eyebolts 48 are pivoted at their lower eyelet ends to brackets 49 fastened to the side wall of the container adjacent to the rim 47 and swing upwardly therefrom through peripheral slots 51 in the cover for cinching down of the cover by wing nuts 52 carried on the outer free ends of the bolts. In this manner the cover may be readily removed, taking with it all of the internal working parts and thus leaving the interior of the container in full view for inspection, cleaning, et cetera. Also the internal parts are thus readily removed as a unit for inspection, cleaning or repairs as may be required.

Another important feature of the present apparatus is the provision on the exterior of the container 11 of a sight glass 56 which is arranged for direct reading of the head of liquid in the container over the outlet passage. The sight glass here consists of a vertical tube of transparent material such as glass or plastic or the like and which is connected at its opposite ends 57 and 58 to the interior of the container by fittings or nipples 61 and 62. A calibration scale 63 is provided on the outside of the container opposite the sight glass 56 for reading of the liquid level directly in inches of liquid head above the center line of the outlet passage. In this manner the actual head of liquid in the container may be visibly observed and set independent of any other variables which may exist such as variations in pressure in the input line.

Cooperating with the accurate setting and maintenance of a constant head over the discharge passage provision is made for mounting an orifice bearing member 66 in the outlet passage for very accurate metering of the liquid discharge. As will be best seen in Figure 2 an outlet fitting 67 is carried by the side wall of the container near the bottom 68 thereof and cooperates with a threadably attached section 69 to secure in place a perforated washer-like orifice member 66. A series of such orifice members having different sized apertures may be supplied with each unit so as to provide in cooperation with the variable liquid head a very wide range of discharge rates. For example, by using a minimum size orifice with a minimum head the liquid discharge may be set at about one gallon per hour. The same orifice may be used to obtain output rates up to four or five gallons per hour by increasing the liquid head in the container. Larger orifices will extend the output up to, say, seventy or more gallons per hour. An advantage of using a plurality of aperture members is that each limits the range of output so that it would not be possible for the operator to make a blunder and go from one to fifty gallons per hour with the same orifice member. Normally the range with each orifice member is about two times and most agricultural chemicals are safe within twice their application range.

Section 69 is here coupled to an output T 71 having a hose nipple 72 threaded into one outlet passage 73 thereof for connection to a hose leading to the irrigation ditch. As an important feature of the present construction the T 71 is set vertically and the opposite outlet passage 74 is arranged at the top side of the unit and left open so that the outlet fitting is vented to the atmosphere on the downstream flow side of the orifice member 66. The T thus functions as a vacuum breaker in the discharge line so as to insure a constant discharge rate independent of the length, elevation, or pressure drop in the outlet hose. This simple type vacuum breaker accomplishes two things. If the user does not attach a sufficiently large hose, or if he is trying to go uphill with the discharge hose, the liquid will run out from the top of the T and it is obvious to the user that he is in trouble and a correction will need be made. Similarly, if he is running down a very steep incline and is running at a high rate, it is not at all inconceivable that the liquid running down the hose would create a vacuum at the orifice and thus draw liquid through the orifice. Any such liquid pulling effect is stopped by the open top T. A filter screen 76 may be attached to the inside of the bushing or fitting 67 for filtering of the liquid passing from the container and for removal of the filter screen from the outside of the container. As will be observed, this location of the screen places it at a point of lowest velocity movement and a maximum area is exposed at very slow rates of flow.

The float 19, valve housing 14 and valve 18 are preferably made of materials which are inert to the concentrated liquids to be handled. The float may be molded or otherwise formed of a whipped or aerated polystyrene. The valve housing and valve may be formed out of polyethylene which is normally quite difficult to work. For this reason the valve housing may be simply formed of a cylindrical piece having an enlarged bore 77 defining the valve chamber and connecting at one end to a reduced bore 78 which may be threaded as here shown for convenient connection to the lower end 43 of the inlet pipe 41. The shoulder 79 lying between the two bores conveniently forms the valve seat 16. The valve member 18 may be conveniently formed of fluted elongated form for low friction passage of the liquid through the valve chamber and is here provided with a reduced upper end 81 for movement to and from the seat 16. As an important feature of the present construction, the end end 81 is formed with annular groove 82 for receipt of an O ring 83 which engages the seat 16 to seal the valve in closed position. Thus a whole new sealing arrangement is easily accomplished by the removal of a used or worn O ring and the snapping of a new O ring into place.

A modified form of the construction is illustrated in Figure 4 of the drawing wherein the liquid inlet passage 12a is moved down the side wall of the container 11a to near the outlet 13a of the container, and the inlet 12a is connected by a length of flexible tubing 86 to the valve housing 14a. Vertical adjustment of the valve housing 14a and the associated valve and float assembly is here effected by a rod 87 which extends upwardly from the valve housing 14a and is slidably mounted through the cover 42a in the same manner as the input pipe 41 in the first described embodiment. The advantage of this modification is that the inlet and outlet will be quite close to the same height and it will be possible to operate this unit when positioned, for example, on the side of the large supply tank, without losing several inches of vertical height otherwise taken by the rigid inlet pipe 41 of the first described embodiment.

In practice the container 11 and its internal apparatus may be mounted on the side of the main supply tank or at any other desired position supplying it with a hose from the supply tank. If the latter position is lower than the supply tank the feed may be by gravity. On the other hand, if it is necessary to mount the container 11 above the storage tank as may be the case in elevated irrigation systems, high standpipes or pressure systems, the liquid from the supply tank may either be pumped into the container 11 or be forced into the container by compressed air applied to the storage tank. In any of such instances it is only necessary to provide a flow of liquid to the container as the valve 18 is opened under the operation and control of the float 19. With any of the various types of installation, the farmer has only to set the head of liquid in the container 11 by raising or lowering the valve housing while observing the head in the sight glass 56 and thereafter the apparatus will automatically control the inflow of liquid to maintain the predetermined head in the container, and this will, of course, be accomplished irrespective of the height of liquid in the supply tank.

I claim:

1. A constant flow liquid dispensing apparatus comprising, a cotnainer for liquid having inlet and outlet passages, means mounted in said container in communication with said inlet passage and providing a downwardly opening valve seat and depending valve guide means, a valve mounted internally of said guide means for vertical reciprocation to and from said seat to control the flow of liquid into said container, a float mounted in said container and having a hollow core dimensioned to surround said guide means, and means connecting said float and valve for joint vertical movement whereby said liquid flow will be controlled as a function of liquid height in said container.

2. A constant flow liquid dispensing apparatus comprising, a container for liquid having inlet and outlet passages, means mounted in said container in communication with said inlet passage and providing a downwardly opening valve seat and depending valve guide means, a valve mounted internally of said guide means for vertical reciprocation to and from said seat to control the flow of liquid into said container, a float mounted in said container and having a hollow core dimensioned to surround said guide means, means connecting said float and valve for joint vertical movement whereby said liquid flow will be controlled as a function of liquid height in said container, and means limiting the relative downward movement of said float and valve with respect to said valve seat whereby said guide means and valve and float will be at all times retained in a unitary inter-nested assembly.

3. A constant flow liquid dispensing apparatus comprising, a container for liquid having inlet and outlet passages, means mounted in said container in communication with said inlet passage and providing a downwardly opening valve seat and depending valve guide means, a valve mounted internally of said guide means for vertical reciprocation to and from said seat to control the flow of liquid into said container, a float mounted in said container and having a hollow core dimensioned to surround said guide means, and means connecting said float and valve for joint vertical movement and extending transversely through said guide means and being supported thereby in a lowermost position of said valve and float in a unitary internested assembly of said valve and guide means and float.

4. A constant flow liquid dispensing apparatus comprising, a container for liquid having inlet and outlet passages, means mounted in said container in communication with said inlet passage and providing a downwardly opening valve seat and depending valve guide means, a valve mounted internally of said guide means for vertical reciprocation to and from said seat to control the flow of liquid into said container, a float mounted in said container and having a hollow core dimensioned to surround said guide means to provide an internested assembly, means connecting said float and valve for joint vertical movement whereby said liquid flow will be controlled as a function of liquid height in said container, and manually engageable means connected to said first mentioned means and extending exteriorly of said container for adjusting the vertical position of said assembly in said container for determining said liquid height therein.

5. A constant flow liquid dispensing apparatus comprising, a container for liquid having inlet and outlet passages, a sight glass arranged for reading the head of liquid in said container over said outlet passage, means mounted in said container in communication with said inlet passage and providing a downwardly opening valve seat and depending valve guide means, a valve mounted internally of said guide means for vertical reciprocation to and from said seat to control the flow of liquid into said container, a float mounted in said container and having a hollow core dimensioned to surround said guide means and being connected to said valve for joint vertical movement, and manually engageable means connected to said first mentioned means for raising and lowering said valve seat to enable the operator with the assistance of said sight glass to set said liquid head for automatic control by said float and valve.

6. A constant flow liquid dispensing apparatus comprising, a container having a liquid inlet pipe and a liquid outlet passage, a valve housing secured to said pipe and formed with an interior valve chamber having a valve seat for controlling liquid flow from said pipe to said container, a valve member mounted in said chamber and guided thereby for vertical reciprocation to and from said seat to control said flow, a float mounted in said container and having a hollow core surrounding said valve housing, said valve housing having an opening through the side wall thereof at said chamber, means extending through said opening and connecting said valve and float for joint vertical movement and limiting the relative downward movement of said float and valve with respect to said housing so as to retain said valve and housing and float in a unitary internested assembly, and manually engageable means connected to said inlet pipe for raising and lowering said pipe and housing in said container for setting the head of liquid in said container over said outlet passage.

7. A constant flow liquid dispensing apparatus comprising, a container having a liquid inlet pipe mounted for movement therein and a liquid outlet passage, a valve housing secured to said pipe and formed with an interior vertically elongated valve chamber having a valve seat adjacent its upper end communicating with said pipe and being open at its lower end to said container, an elongated fluted valve member mounted in said chamber and guided thereby for vertical reciprocation to and from said seat, an O ring carried by said valve member and engageable with said seat to control the flow of liquid into said container, a float mounted in said container and having a hollow core dimensioned to surround said valve housing, said valve housing having an opening through the side wall thereof at said chamber, means extending through said opening and connecting said valve and float for joint vertical movement and limiting the relative downward movement of said float and valve with respect to said housing so as to retain said valve and housing and float in a unitary internested assembly, and manually engageable means connected to said inlet pipe for raising and lowering said pipe and housing in said container for setting the head of liquid in said container over said outlet passage.

8. A constant flow liquid dispensing apparatus comprising, a container having a relatively movable liquid inlet pipe and a liquid outlet passage, a cover for said container, a valve housing secured to said pipe and formed with an interior valve chamber having a valve seat therein, a valve member mounted in said chamber and guided thereby for vertical reciprocation to and from said seat to control the flow of liquid into said container, a float mounted in said container and having a hollow core surrounding said valve housing, said valve housing having an opening through the side wall thereof at said chamber, means extending through said opening and connecting said valve and float for joint vertical movement and limiting the relative downward movement of said float and valve with respect to said housing so as to retain said valve and housing and float in a unitary internested assembly, and manually engageable means slidably mounted through said cover and connected to said inlet pipe for raising and lowering said pipe and housing in said container for setting the head of liquid in said container over said outlet passage.

9. A constant flow liquid dispensing apparatus comprising, a container having a liquid outlet passage, a cover for said container, a liquid inlet pipe slidably mounted through said cover for vertical reciprocation of a lower end thereof in said container, a valve housing secured to said pipe end and formed with an interior valve chamber having a valve seat therein, a valve member mounted in said chamber and guided thereby for vertical reciprocation to and from said seat to control the flow of liquid into said container, a float mounted in said container and having a hollow core surrounding said valve housing, said valve housing having an opening through the side wall thereof at said chamber, means extending through said opening and connecting said valve and float for joint vertical movement and limiting the relative downward movement of said float and valve with respect to said housing so as to retain said valve and housing and float in a unitary internested assembly, and manually engageable means for adjustably securing said inlet pipe to said cover for setting the head of liquid in said container over said outlet passage.

10. A constant flow liquid dispensing apparatus comprising, a container having liquid inlet and outlet passages, a cover for said container, a valve housing mounted in said container and formed with an interior valve chamber and a valve seat therein, a flexible conduit connecting said valve housing to said inlet passage for movably positioning said housing in said container, a valve member mounted in said chamber and guided thereby for vertical reciprocation to and from said seat to control the flow of liquid into said container, a float mounted in said container and having a hollow core surrounding said valve housing and being connected to said valve for joint vertical movement, and manually engageable means carried by and mounted through said cover and connected to said housing for setting the vertical position of said housing in said container.

11. A constant flow liquid dispensing apparatus comprising, a container for liquid having inlet and outlet passages, means mounted in said container in communication with said inlet passage and providing a downwardly opening valve seat and depending valve guide means, a valve mounted internally of said guide means for vertical reciprocation to and from said seat to control the flow of liquid into said container, a float mounted in said container and having a hollow core dimensioned to surround said guide means, means connecting said float and valve for joint vertical movement whereby said liquid flow will be controlled as a function of liquid height in said container, and an outlet fitting connected to said outlet passage and adapted for connection to a discharge conduit, said fitting being vented directly to the atmosphere exteriorly of said container so as to constantly maintain said outlet passage to atmospheric pressure.

References Cited in the file of this patent

UNITED STATES PATENTS

| | | |
|---|---|---|
| 1,522,982 | Strandt | Jan. 13, 1925 |
| 1,523,493 | Risser | Jan. 20, 1925 |
| 2,106,340 | Conover | Jan. 25, 1938 |
| 2,427,059 | Landon | Sept. 9, 1947 |